Sept. 1, 1959                    M. J. HILER                    2,901,864
              SOIL CONDITIONER AND METHOD OF USING
Filed Sept. 22, 1955                                    4 Sheets-Sheet 2

INVENTOR
MALVERN J. HILER
BY
ATTORNEYS

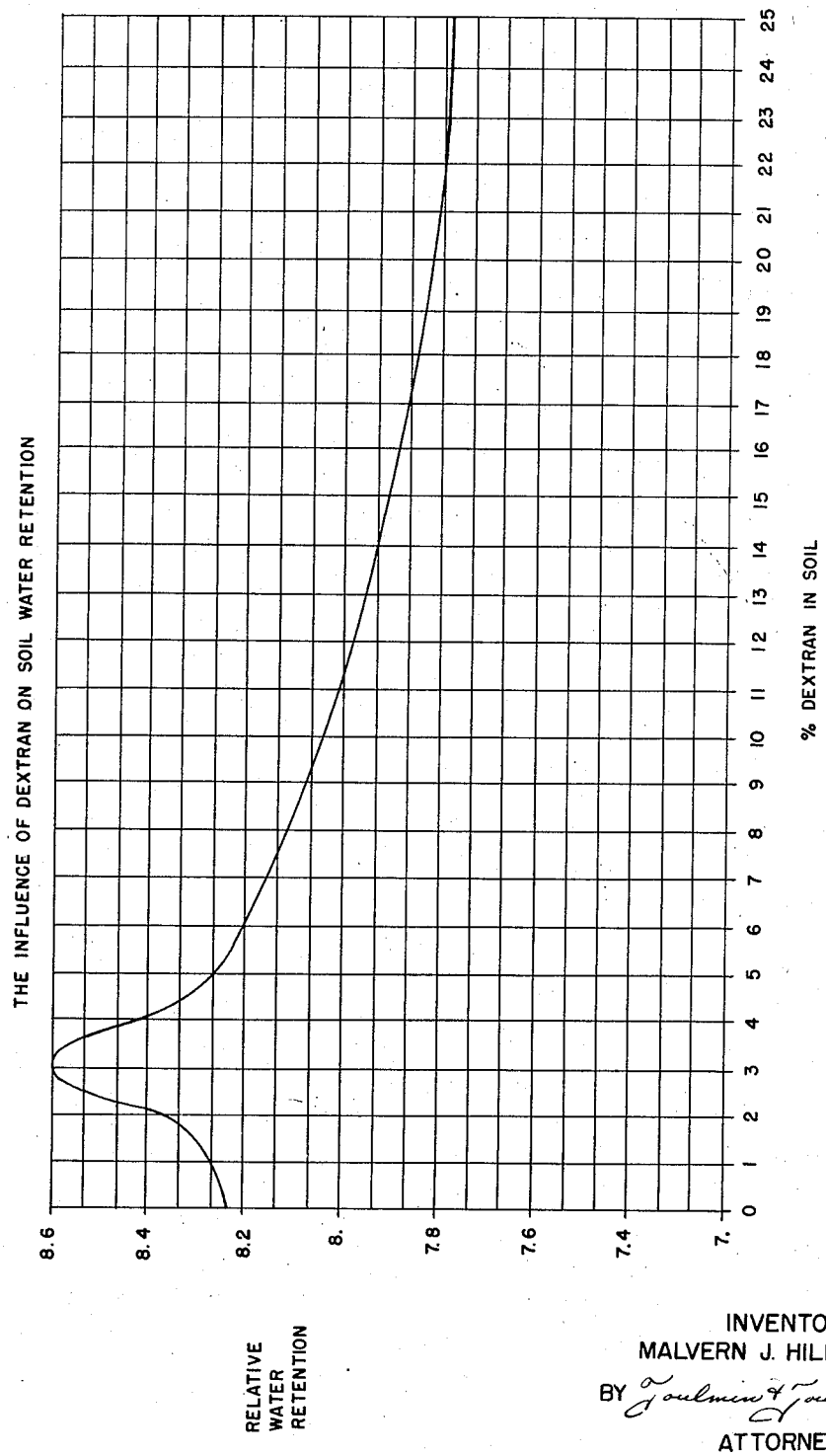

United States Patent Office 2,901,864
Patented Sept. 1, 1959

2,901,864

SOIL CONDITIONER AND METHOD OF USING

Malvern J. Hiler, Dayton, Ohio, assignor to The Commonwealth Engineering Company of Ohio, Dayton, Ohio, a corporation of Ohio Application September 22, 1955, Serial No. 535,983

3 Claims. (Cl. 47—58)

This invention relates to a soil conditioner and to a method of producing and using the same.

This application is a continuation-in-part of my prior application Serial No. 286,961, filed May 9, 1952, now abandoned.

Among the important characteristics of all soils are (1) the soil texture, which refers to the relative proportions of the individual grain or particle sizes; (2) the structure, that is the physical form of the soil particles, the most common being the granular, the prismatic and the blocky; (3) the soil color; and (4), the inorganic and organic chemical composition. These characteristics vary considerably with locality and are influenced by climate, living matter contained in the soil, time or soil age, parent rock, land slopes, and so forth.

To achieve a productive soil two factors are of vital importance (1), the physical characteristics and (2) the fertility which is a function of the chemical constituency, particularly the available plant nutrients and the balance among the nutrients in the soil. Resolution of these factors has been attained in general by carefully considered agricultural methods, for example, of crop rotation, strip cropping, terracing and irrigation, combined with appropriate plowing, soil stirring and fertilizing.

Of great importance is the soil structure. In the blocky or prismatic structures the soil aggregates may attain dimensions up to 6 inches and the irregular blocks of the block structure, and elongated vertical blocks of the prismatic structure, are considered, at least when occurring in the surface layers, to be relatively poor soils from a productive point of view. On the other hand, the granular structure in which the aggregates generally vary in size from the very small to about ½-inch in diameter, is considered a beneficial soil condition.

Maintenance of the soil in this desired granular structural form may be difficult however as even improper tillage will in some cases destroy the granular form returning it to a massive state than can be overcome only by careful working for a period which may be years.

The fertility of the soil is materially affected by natural conditions, rain water, for example, percolating the soil leaches out basic chemicals rendering the soil sour; the heat of the sun in the dry regions occasions salt accumulations which must be washed out by irrigation before crop plants can be grown.

The productive soil must however be sufficiently porous for air, water and plant roots to penetrate through the same easily; good soils must also have the capacity to retain sufficient water between rains for accomplishing plant growth. Hence soil porosity is a decidedly important factor in the attainment of productive soils.

It is the primary object of this invention to provide a new conditioner for soil the essential soil conditioning component of which is native, unhydrolyzed dextran.

The dextran used is produced by bacterial fermentation, i. e., by the action of dextran-synthesizing Leuconostoc bacteria on sucrose native product of such fermentation as present in or recovered by precipitation from the fermentate, and is soluble or swellable in water.

The dextran may be produced in a final usable form with bacteria and nutrients therein, i. e. the fermentate may be used, or the native dextran may be selectively isolated in a pure form for application to the soil. The isolated dextran is particularly useful where the soil to be treated does not require the added benefits of nutrients but does require stabilization of the physical properties. Thus, the isolated dextran is of particular value where it is desired to condition the soil for proper aeration and moistening of seedlings while not hindering the sprouting and while retarding the washing away of soil and the leaching of important constituents therefrom. A typical example of such action is erosion control.

The native, unhydrolyzed dextran or composition comprising it may be applied to the soil in powder form. Preferably, the earth should be turned over to a depth of at least about 3 inches in forming applications, although in household uses, such as with potted plants, the depth may be considerably less as the powder will be carried to the plant roots when the same is solved by moisture in the soil or applied to the soil after mixing thereof with the dextran.

The liquid fermantate in which the native, unhydrolyzed dextran is biosynthesized from sucrose contains bacteria and nutrients in addition to the dextran and therefore has plant nutrition value. It may be used in the practice of this invention, after sterilization to avoid bacterial or mold destruction of components thereof during storage periods prior to use.

The invention will be more fully understood by reference to the following detailed description and accompanying drawings wherein:

Figure 4 is a graphic representation indicating that the water retention capacity of soil having the native unhydrolyzed dextran incorporated therein has an optimum value.

Figure 1:
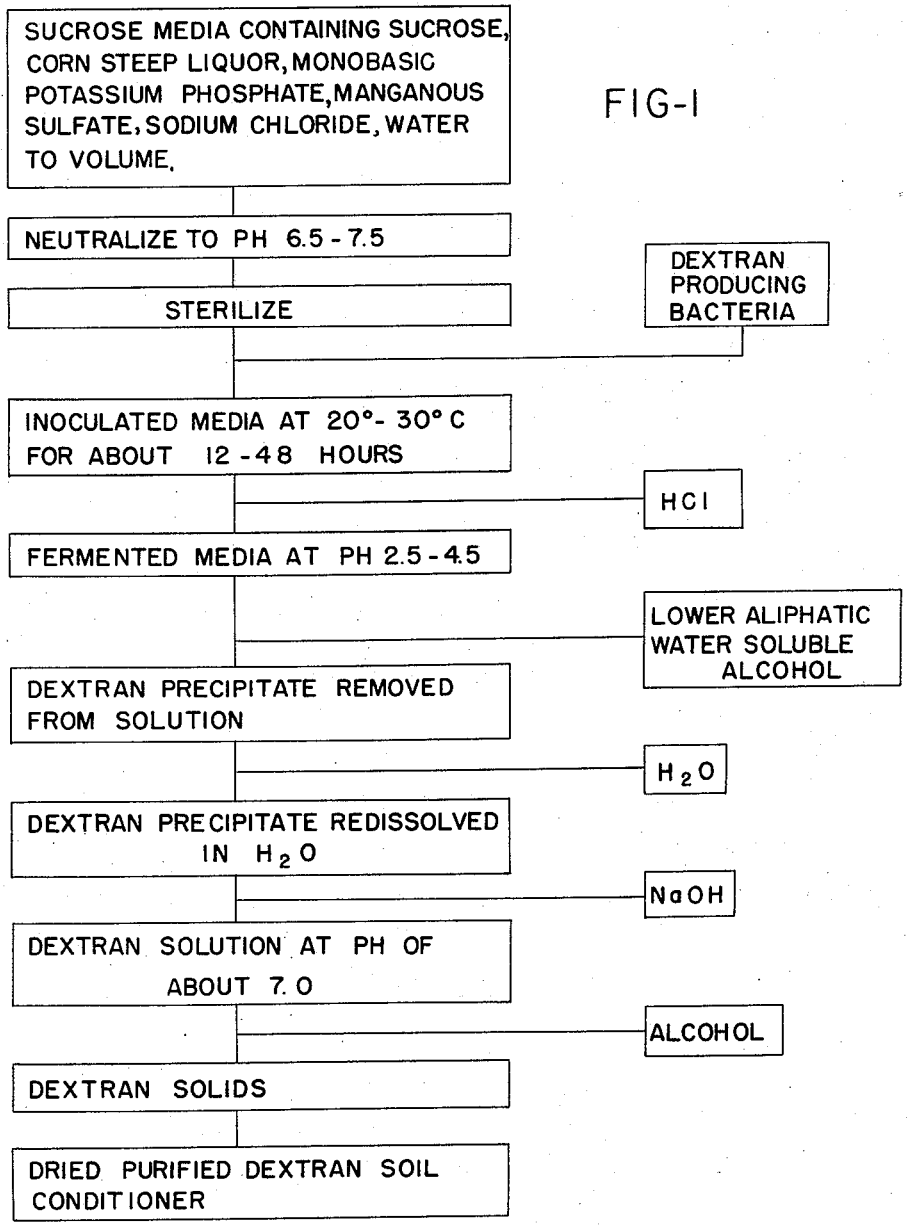
Figure 1 is a flow chart of a preferred embodiment of the invention.
Figure 2:
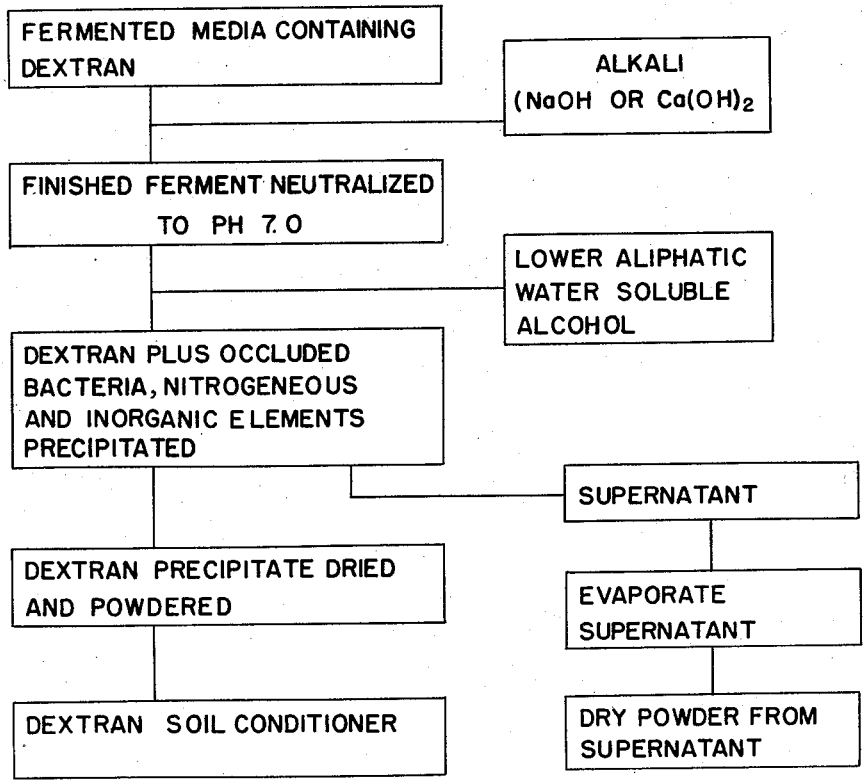
Figure 2 is a flow chart of another embodiment of the invention.
Figure 3:
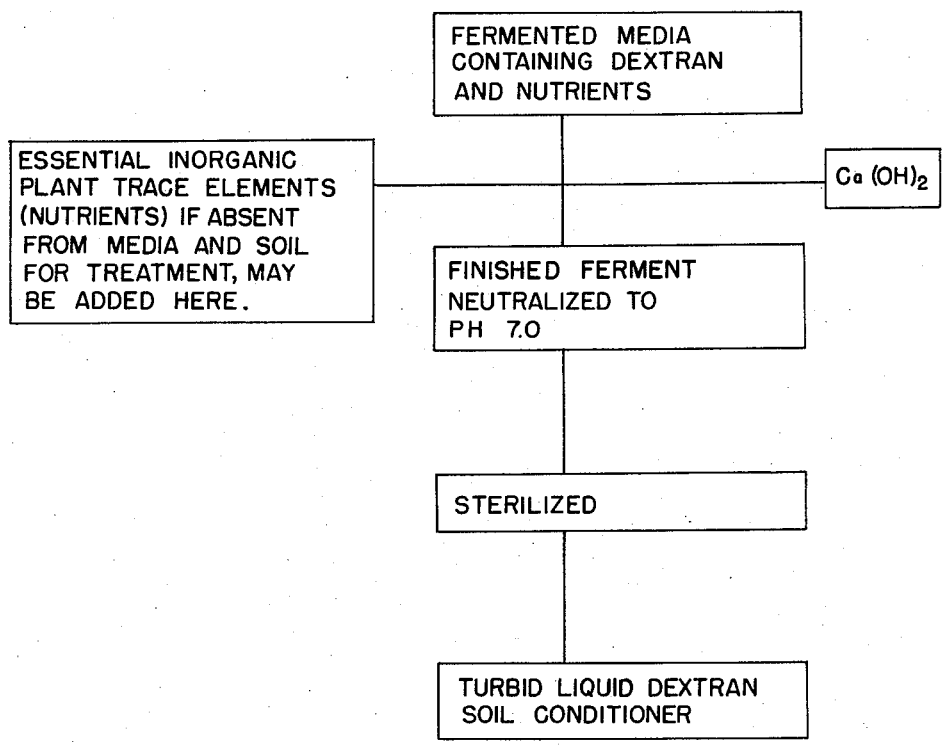
Figure 3 is a flow chart of yet another embodiment.

The following illustrates the method of obtaining the native, unhydrolyzed dextran which, as present in the fermentate, or after isolation therefrom, is used as the essential conditioner for soil, in accordance with this invention.

An aqueous nutrient medium having the following composition is prepared:

| | Percent by weight |
|---|---|
| Sucrose | 20 |
| Corn steep liquor | 2 |
| Monobasic potassium | .5 |
| Manganous sulfate | .002 |
| Sodium chloride | .50 |
| Water | Balance |

This media is adjusted to a pH of from about 6.5 to about 7.5, preferably 7.2, and then sterilized. The material is then cooled to room temperature and inoculated with a culture of dextran producing bacteria, for example, *Leuconostoc mesenteroides* B–512 (NRRL) and the material is allowed to incubate at about 20 to 30° C. (optimum 25° C.) until a maximum yield of dextran has been attained; normally a period of from 12 to 48 hours will be satisfactory for this procedure. The fermented product contains approximately 80–85% water and is a thick turbid liquid. This liquid may be sterilized and applied to the soil or it may be dried, powdered and sterilized prior to application to the soil.

Upon completion of the fermentation, which process renders the material somewhat acid, that is to a pH of 3.5–5.5 (average 4.2), calcium hydroxide is added to the ferment to bring the pH thereof to about 7.0 to 8.0; this procedure aids in the precipitation of phosphates. Thereafter alcohol, which may be a water-miscible aliphatic, such as methyl, ethyl or isopropyl, is added in sufficient quantity to precipitate the dextran and this precipitation brings down, with the dextran, occluded and adsorbed bacteria, and nitrogenous and inorganic elements, which may be advantageous for plant nutrition. To occasion the complete precipitation of the dextran and the other noted materials, it is preferable to allow the material to stand for a period of about 6 hours. The precipitated dextran may be then dried in any suitable manner, for example, by drum drying. Thereafter the material is powdered.

The supernatant which after the precipitation period has previously been siphoned off from the precipitated dextran contains a quantity of material rich in plant nutrient and may, if desired, be evaporated to provide a dry product containing said nutrients, and this in powdered form may then be added to the precipitated dextran, if desired.

Where a purer dextran is desired the product of the fermentation may have the pH thereof adjusted to a range between about 2.5 and 4.5 by adding hydrochloric acid thereto. In this instance it will be noted that the calcium hydroxide addition step is eliminated. After the addition of hydrochloric acid an aliphatic alcohol is added in sufficient quantity to precipitate the dextran. This precipitated dextran will not contain as much of the phosphates, and so forth, but will have some small amount of impurities. Accordingly, it is preferable after filtering out the precipitate to redissolve the same in water to adjust the pH to 7.0 with sodium hydroxide and reprecipitate. In some instances several precipitations may be necessary to insure the attainment of completely pure dextran. The product of the several precipitations may be dried free of alcohol and most of the water and is then ready to be powdered and packaged for use as a soil conditioning agent.

This product is native, unhydrolyzed dextran having a molecular weight of at least a million determined by light scattering measurements and estimated to be as high as 40–60 millions.

Instead of inoculating the sucrose-containing nutrient medium with a culture of Leuconostoc mesenteroides B–512 (NRRL), any other of the Leuconostoc strains known to art on sucrose yield, under fermentation conditions as described herein, native, water-soluble or water-swellable dextran of high molecular weight estimated to be in the millions, may be used.

Either the powdered isolated dextran, or the fermentate, may have incorporated therewith nitrogen-fixing bacteria such as those of the genus Rhizobia. These bacteria are effective with certain plants of the genus Leguminosae when grown in symbiotic relationship therewith to fix the nitrogen of the air and convert it to organic nitrogenous compounds, thus enriching the soil around the plants and providing a nitrogenous nutrient for other succeeding crops. Plant species capable of fixing nitrogen in combination with the Rhizobia include alfalfa, clover, beans, soy beans, lupines and trefoil; thus the bacteria species *Rhizobium meliloti* is useful with alfalfa, or with white or sweet clover; *Rhizobium trefolii* is useful with red, white and crimson clovers; *Rhizobium leguminosarum* infects garden peas and vetch, while *Rhizobium lupini* is effective with lupines and *Rhizobium paponicum* with soy beans, and so forth.

To employ these bacteria in combination with the soil conditioner the bacteria contained in a liquid are first centrifuged or filtered therefrom, which results in the attainment of the bacteria as a sludge; this matter is then spread out at room temperature and dried preferably under high vacuum conditions. The dry bacteria-containing powder may then be mixed directly with the dry dextran soil conditioner, preferably generally to the extent of 0.1% by weight thereof.

In contrast to the above described powder or dry soil conditioning agents a liquid product may be rather simply achieved by taking the finished ferment which is the thick turbid liquid product of the Leuconostoc action on the sucrose media, neutralizing with NaOH, sterilizing the same and bottling directly for use. This liquid product is particularly advantageous for use on soils lacking in an essential metallic element for, prior to sterilization of the ferment, soluble salts of metal or metals such as copper, zinc, manganese, or the trace elements generally may be added thereto. The quantity of such element added need only be very slight to provide a source of supply for the deficient soil, about .1 of 1% by weight of the ferment being generally adequate. The addition may be simply by stirring the soluble salt into the neutral thick turbid ferment, whereafter the noted sterilization bottling is effected.

In the employment of either the fermentate or the isolated native dextran it is considered that approximately 0.01% to about 4% by weight of the conditioner may be suitably applied to the soil.

If the soil is lacking in plant nutrients, it is preferable to employ the fermentate containing the nutrients in sufficient amount to bring the soil to a normal condition with regard to proper plant nutrient concentrations of essential plant soil components.

In using the powdered isolated dextran or fermentate, the conditioner may be simply spread over the soil and then mixed therewith in any suitable manner and preferably to a depth of 3 to 4 inches.

The dried, powdered dextran or fermentate containing it may be used as a mulch, with or without combination with other organic materials commonly employed in mulches. In such mixtures, the native, unhydrolyzed dextran may be present in an amount of 1% to 2% by weight of the mulch. The particulate dextran, or fermentate, or mulch containing the same is spread over the desired plant location.

Where erosion control only is a consideration, the particulate isolated native dextran may be employed in concentrations of about 1% to 4% by weight of the soil with which it is mixed.

As will be noted from Figure 4 of the drawings, there tends to be an optimum concentration at which the native, unhydrolyzed dextran added to the particular soil has optimum conditioning effect so far as the capacity for water absorption is concerned. Thus, optimum conditioning of the soil illustrated by Figure 4 was accomplished by adding 4–5% by weight of powdered water-soluble B–512 native, unhydrolyzed dextran to it. The addition of other, different amounts of the native, unhydrolyzed dextran to a given soil, for optimum conditioning thereof, may be indicated.

The native, unhydrolyzed dextran having a molecular weight estimated to be in the millions which is used in the present method is a mucilaginous gum, which is water-soluble or swellable in water. It might have been expected that, in contact with moisture present in or applied to the soil, it would yield a sticky, unworkable mass. This is believed to be one reason why, where dextran has been suggested for soil conditioning in the prior art, the dextran added to the soil was an acid-hydrolyzate of the native dextran having a molecular weight of only about 14,000.

It is found, in accordance with the present invention, that the native, unhydrolyzed dextran can be added as such to the soil in concentrations as required, and up to 5% or even higher, and wet with water in situ in the soil, without converting it to a sticky, agglutinous, unworkable mass. On the contrary, the native, unhydrolyzed dextran, in concentrations of 0.1% to 5% and even up to 10%, forms a film over the discrete soil particles which has high moisture absorbing and retaining capacity and serves to maintain the particles in readily workable condition, to protect the enclosed particles from the leaching effects of heavy rains, and to inhibit structural changes which, if not inhibited, would lead to the formation of undesired particle aggregation and excessive caking.

It is found that the film is persistent (silty clay loam treated with 0.5% B-512 native dextran remained in a condition of superior stability as compared to a control sixty-nine days after treatment) and that it affords protection even under excessive working conditions of the soil as is sometimes encountered in dry areas. Where the dextran is used in mixture with bacteria and nutrient (fermentate), the protective film formed on the soil particles also serves as a source of supply for enrichment of the soil. This dual purpose function is of vital importance in areas where erosion is a material factor.

The dextran film, due to its pronounced capacity to bind water, permits moisture to be acquired by the soil contained in the film, access of moisture to the soil is controlled by transfer thereof through the film so that the moisture supply is adequate but leaching and erosion are prevented.

The discovery that the native, unhydrolyzed dextran having a molecular weight of at least one million and estimated to be much higher than that and as high as 40-60 millions may be applied as such to the soil without agglomerating it into a unworkable adhesive mass has outstanding advantages. Expensive, tedious pre-hydrolysis of the dextran to a low molecular weight (for dextran) is not required. Also, when dextran is hydrolyzed by acid the hydrolyzate comprises a mixture of high, medium and low molecular weight fractions. In order to obtain a product having a molecular weight of, say, 14,000, separation of that fraction is required. Only a relatively small portion of the acid hydrolyzate has an average molecular weight of 14,000. Separation of that fraction and use thereof as the soil conditioner means that the major portion of the hydrolysis product is discarded. The waste of dextran is substantial. Such waste is avoided by the present method which utilizes the total of the native, unhydrolyzed dextran as produced in the fermentate.

There is another important advantage in the use of the native, unhydrolyzed dextran. Soils vary with respect to pH, and may be acid, alkaline, or substantially neutral. The native, unhydrolyzed dextran is hydrolyzed by acid. If the particular soil is acidic and optimum conditioning thereof is achieved by dextrain of molecular weight somewhat lower than that of the native dextran, such hydrolysis will be effected by acids in the soil, after the native dextran has been mixed into it, with resulting cleavage of the very high molecular weight native dextran by the soil acids to the molecular weight at which the optimum conditioning effect of the dextran for that particular soil is realized. In other words, by applying the dextran to the soil in its native extremely high molecular weight condition, the action of acids in the soil thereon is allowed for so that even if acids are present and effect hydrolysis of the dextran, the molecular weight is still such that the dextran has the required film-forming and protective action.

The following example is illustrative of the invention, it being understood that the example is not limitative.

In testing for the stabilizing effect of the dextran on the soil, the soil samples were prepared for the treatment by sieving through a 20-mesh screen. Appropriate preweighed amounts of powdered dextran were added to 100 grams samples of the soil and thoroughly mixed. The moisture content of the soil was then brought to 30% based on the weight of dry soil. The wet soil was allowed to stand for 24-48 hours when it was passed through a 4-mesh screen. Twenty-five gram samples of soil aggregates, with diameters less than 4.7 mm. and greater than 2.0 mm. were used for determining soil water stability. Water stability of the particular soil under test was recorded as that percent of dried soil aggregates, greater than 0.25 mm., retained on the screens after wet-sieving for 30 minutes.

*Example*

Native, unhydrolyzed B-512 dextran was mixed with different soil samples and stability tests were run as described. The results are tabulated below:

| Percent Dextran | Soil Class | Percent Stability |
|---|---|---|
| 0.0 | Clay loam | 42.2 |
| 0.3 | do | 69.8 |
| 0.6 | do | 83.4 |
| 0.0 | Silty Clay Loam | 61.7 |
| 0.3 | do | 78.2 |
| 0.6 | do | 78.6 |
| 0.0 | Silt Loam | 29.3 |
| 0.3 | do | 53.0 |
| 0.5 | do | 98.4 |
| 0.0 | Sandy Loam | 33.0 |
| 0.5 | do | 76.2 |

The results given represent averages of at least duplicate analyses.

Similar results were obtained with the dextran obtained by the action on sucrose of other dextran-synthesizing strains of Leuconostoc yielding a native dextran having a molecular weight of at least one million and estimated to be high in the millions.

The data tabulated show that the application of the native, unhydrolyzed dextran results in effecting stabilization of different classes of soil from those that are coarse in texture to those that are of fine texture. Whereas the finer textured soils tend to cake and are slowly permeable to water, the sandy soils are too "open" and tend to be arid. As is shown in the table, both soil classes show substantially increased stability as compared to the control to which the dextran was not added.

The beneficial action of the native, unhydrolyzed dextran in stabilizing the soil is realized, also, in the improved rapidity of seedling emergence and plant growth as shown by laboratory and field tests with various plants including soybeans and sweet corn.

When the dextran soil conditioning agent is incorporated with soils including the Podzol, Gray Brown Podzolic, Red Podzolic, Yellow Podzolic and Sierozens, a distinct improvement may be attained from the standpoint of improved soil fertility, better plant growth and crop yield.

Summarizing, the soil conditioner of this invention may be incorporated with soil simply by sprinkling the powder or liquid product in suitable controlled amounts over the surface and mixing with the soil. Improvement in plant growth and plant yield for such plants as *Pisum sativum* (peas), Lycopersicon (tomatoes, family Solanaceae), *Triticum vulgare* (bread wheat) and *Solanum tuberosum* (potatoes), is attained.

What is claimed is:

1. The method of conditioning soil which comprises the step of applying thereto a preformed conditioner therefor consisting essentially of a sterile fermentate containing native, unhydrolyzed dextran having a molecular weight of at least one million and obtained by inoculating a sugar-containing nutrient medium and comprising corn steep liquor and inorganic salts with a dextran-synthesizing strain of Leuconostoc and incubating the medium until the native dextran of said molecular weight is produced therein, said fermentate being in neutral, sterile condition, and then wetting the soil with water.

2. A soil conditioner consisting of a viscous fermentate product containing approximately 80-85% water and in the form of a thick turbid liquid which has been sterilized, said fermentate being composed of native, unhydrolyzed dextran having a molecular weight of at least one million, together with a nutrient medium containing sugar, corn steep liquor, inorganic salts and water.

3. A soil conditioner consisting of a viscous fermentate product containing approximately 80–85% water and in the form of a thick turbid liquid composed of native, unhydrolzed dextran having a molecular weight of between 40 and 60 million, and an aqueous nutrient medium comprising approximately the following composition by weight: sucrose 20%; corn steep liquor 2%; inorganic salts 1%; and the balance water, the resultant nutrient medium being adjusted to a pH of between 6.5 and 7.5 and sterilized and inoculated with a culture of dextran producing bacteria, the mixture being incubated at about 20–30° C. for a period of between about 12–48 hours.

References Cited in the file of this patent

UNITED STATES PATENTS

| | | |
|---|---|---|
| 2,004,706 | Nuske | June 11, 1935 |
| 2,360,327 | Bailey | Oct. 17, 1944 |
| 2,392,258 | Owen | Jan. 1, 1946 |
| 2,437,518 | Gronwall | Mar. 9, 1948 |
| 2,756,134 | Novak | July 24, 1956 |

OTHER REFERENCES

Martin: "Micro-organisms and Soil Aggregation; II. Influence . . .," published February 1946 in Soil Science (magazine), vol. 61, No. 2, pages 157 through 166.